United States Patent
Kelly

Patent Number: 5,913,204
Date of Patent: Jun. 15, 1999

[54] METHOD AND APPARATUS FOR SURVEYING MUSIC LISTENER OPINION ABOUT SONGS

[76] Inventor: Thomas L. Kelly, 139 E. Hathaway, Havertown, Pa. 19083-1517

[21] Appl. No.: 08/693,355

[22] Filed: Aug. 6, 1996

[51] Int. Cl.[6] .......................... G06F 17/60; G06F 17/30; G06F 17/00; G06F 19/00
[52] U.S. Cl. .............................. 705/500; 705/10; 705/30; 348/1; 348/2; 348/3; 434/363
[58] Field of Search ........................... 705/10, 30; 348/1, 348/2, 3; 434/363

[56] References Cited

U.S. PATENT DOCUMENTS

| | | | |
|---|---|---|---|
| 4,345,315 | 8/1982 | Cadotte et al. | 705/10 |
| 5,023,435 | 6/1991 | Deniger | 235/375 |
| 5,041,972 | 8/1991 | Frost | 705/10 |
| 5,124,911 | 6/1992 | Sack | 705/10 |
| 5,198,642 | 3/1993 | Deniger | 235/375 |
| 5,227,874 | 7/1993 | Von Kohorn | 705/10 |
| 5,237,157 | 8/1993 | Kaplan | 235/375 |
| 5,243,517 | 9/1993 | Schmidt et al. | 600/544 |

*Primary Examiner*—Allen R. MacDonald
*Assistant Examiner*—James W. Myhre
*Attorney, Agent, or Firm*—John F. A. Earley; John F. A. Earley, III; Harding, Earley, Follmer & Frailey

[57] ABSTRACT

A method and apparatus for surveying and reporting listener opinion of a list of songs such as the songs comprising a radio station music library. A group of music listeners is selected from whom individual listener opinions are recorded. A home music preference test kit is fielded to the select listeners for use in each listener's residence. Data from each music preference test kit is then collected, compiled and tabulated to reflect a mean or average listener opinion for each song in the list.

The home music preference test kit includes instructions for completing the test and returning the survey form, a music medium having a preselected number of song hooks representing each song in the library of the radio station. The kit also includes a survey form for recording the listener's opinion of each song based on the song hooks and an honorarium for agreeing to properly complete a survey form.

40 Claims, 7 Drawing Sheets

MUSIC SURVEY FORM

*Important - Please complete and return within 5 days.*

YOUR NAME: _______________________  SEX: Male  Female  AGE: _____
ADDRESS: _______________________  PHONE: _____

List all the radio stations you have listened to in the past week: _______________________

List your <u>favorite</u> radio station(s) to listen to for music: _______________________

Score each song according to the following scale. Only one score per song please! Circle your score.
5=A favorite   4=Like it   3=Okay   2=Don't like it   1=Hate it   T=Tired of it   DK=Don't know it

| Song # | Your Score | Song # | Your Score | Song # | Your Score | Song # | Your Score |
|---|---|---|---|---|---|---|---|
| 1. | 5 4 3 2 1 T DK | 40. | 5 4 3 2 1 T DK | 79. | 5 4 3 2 1 T DK | 118. | 5 4 3 2 1 T DK |
| 2. | 5 4 3 2 1 T DK | 41. | 5 4 3 2 1 T DK | 80. | 5 4 3 2 1 T DK | 119. | 5 4 3 2 1 T DK |
| 3. | 5 4 3 2 1 T DK | 42. | 5 4 3 2 1 T DK | 81. | 5 4 3 2 1 T DK | 120. | 5 4 3 2 1 T DK |
| 4. | 5 4 3 2 1 T DK | 43. | 5 4 3 2 1 T DK | 82. | 5 4 3 2 1 T DK | 121. | 5 4 3 2 1 T DK |
| 5. | 5 4 3 2 1 T DK | 44. | 5 4 3 2 1 T DK | 83. | 5 4 3 2 1 T DK | 122. | 5 4 3 2 1 T DK |
| 6. | 5 4 3 2 1 T DK | 45. | 5 4 3 2 1 T DK | 84. | 5 4 3 2 1 T DK | 123. | 5 4 3 2 1 T DK |
| 7. | 5 4 3 2 1 T DK | 46. | 5 4 3 2 1 T DK | 85. | 5 4 3 2 1 T DK | 124. | 5 4 3 2 1 T DK |
| 8. | 5 4 3 2 1 T DK | 47. | 5 4 3 2 1 T DK | 86. | 5 4 3 2 1 T DK | 125. | 5 4 3 2 1 T DK |
| 9. | 5 4 3 2 1 T DK | 48. | 5 4 3 2 1 T DK | 87. | 5 4 3 2 1 T DK | 126. | 5 4 3 2 1 T DK |
| 10. | 5 4 3 2 1 T DK | 49. | 5 4 3 2 1 T DK | 88. | 5 4 3 2 1 T DK | 127. | 5 4 3 2 1 T DK |

| | | | | | | | |
|---|---|---|---|---|---|---|---|
| 26. | - | 5 | 4 | 3 | 2 | 1 | T DK |
| 27. | - | 5 | 4 | 3 | 2 | 1 | T DK |
| 28. | - | 5 | 4 | 3 | 2 | 1 | T DK |
| 29. | - | 5 | 4 | 3 | 2 | 1 | T DK |
| 30. | - | 5 | 4 | 3 | 2 | 1 | T DK |
| 31. | - | 5 | 4 | 3 | 2 | 1 | T DK |
| 32. | - | 5 | 4 | 3 | 2 | 1 | T DK |
| 33. | - | 5 | 4 | 3 | 2 | 1 | T DK |
| 34. | - | 5 | 4 | 3 | 2 | 1 | T DK |
| 35. | - | 5 | 4 | 3 | 2 | 1 | T DK |
| 36. | - | 5 | 4 | 3 | 2 | 1 | T DK |
| 37. | - | 5 | 4 | 3 | 2 | 1 | T DK |
| 38. | - | 5 | 4 | 3 | 2 | 1 | T DK |
| 39. | - | 5 | 4 | 3 | 2 | 1 | T DK |
| 65. | - | 5 | 4 | 3 | 2 | 1 | T DK |
| 66. | - | 5 | 4 | 3 | 2 | 1 | T DK |
| 67. | - | 5 | 4 | 3 | 2 | 1 | T DK |
| 68. | - | 5 | 4 | 3 | 2 | 1 | T DK |
| 69. | - | 5 | 4 | 3 | 2 | 1 | T DK |
| 70. | - | 5 | 4 | 3 | 2 | 1 | T DK |
| 71. | - | 5 | 4 | 3 | 2 | 1 | T DK |
| 72. | - | 5 | 4 | 3 | 2 | 1 | T DK |
| 73. | - | 5 | 4 | 3 | 2 | 1 | T DK |
| 74. | - | 5 | 4 | 3 | 2 | 1 | T DK |
| 75. | - | 5 | 4 | 3 | 2 | 1 | T DK |
| 76. | - | 5 | 4 | 3 | 2 | 1 | T DK |
| 77. | - | 5 | 4 | 3 | 2 | 1 | T DK |
| 78. | - | 5 | 4 | 3 | 2 | 1 | T DK |
| 104. | - | 5 | 4 | 3 | 2 | 1 | T DK |
| 105. | - | 5 | 4 | 3 | 2 | 1 | T DK |
| 106. | - | 5 | 4 | 3 | 2 | 1 | T DK |
| 107. | - | 5 | 4 | 3 | 2 | 1 | T DK |
| 108. | - | 5 | 4 | 3 | 2 | 1 | T DK |
| 109. | - | 5 | 4 | 3 | 2 | 1 | T DK |
| 110. | - | 5 | 4 | 3 | 2 | 1 | T DK |
| 111. | - | 5 | 4 | 3 | 2 | 1 | T DK |
| 112. | - | 5 | 4 | 3 | 2 | 1 | T DK |
| 113. | - | 5 | 4 | 3 | 2 | 1 | T DK |
| 114. | - | 5 | 4 | 3 | 2 | 1 | T DK |
| 115. | - | 5 | 4 | 3 | 2 | 1 | T DK |
| 116. | - | 5 | 4 | 3 | 2 | 1 | T DK |
| 117. | - | 5 | 4 | 3 | 2 | 1 | T DK |
| 143. | - | 5 | 4 | 3 | 2 | 1 | T DK |
| 144. | - | 5 | 4 | 3 | 2 | 1 | T DK |
| 145. | - | 5 | 4 | 3 | 2 | 1 | T DK |
| 146. | - | 5 | 4 | 3 | 2 | 1 | T DK |
| 147. | - | 5 | 4 | 3 | 2 | 1 | T DK |
| 148. | - | 5 | 4 | 3 | 2 | 1 | T DK |
| 149. | - | 5 | 4 | 3 | 2 | 1 | T DK |
| 150. | - | 5 | 4 | 3 | 2 | 1 | T DK |
| 151. | - | 5 | 4 | 3 | 2 | 1 | T DK |
| 152. | - | 5 | 4 | 3 | 2 | 1 | T DK |
| 153. | - | 5 | 4 | 3 | 2 | 1 | T DK |
| 154. | - | 5 | 4 | 3 | 2 | 1 | T DK |
| 155. | - | 5 | 4 | 3 | 2 | 1 | T DK |
| 156. | - | 5 | 4 | 3 | 2 | 1 | T DK |

*Optional - Use this space for any general comments about radio.*

THANK YOU. THE RADIO STATIONS YOU LISTEN TO APPRECIATE YOUR OPINION.

FOLD HERE FIRST — 22

METHOD AND APPARATUS FOR SURVEYING MUSIC LISTENER OPINION ABOUT SONGS

FIELD OF THE INVENTION

The present invention relates to a method an apparatus for surveying music listener opinion of a list of songs such as the songs contained in a radio station music library. In particular, the invention comprises a survey method and music preference test kit which is sent to the home of selected listeners so that the listener may listen to a representative sample of each song on the list and report the listeners opinion about each song.

BACKGROUND OF THE INVENTION

In order to serve its listeners and maintain high ratings, radio stations conduct music surveys to determine the listener appeal of the songs which make up the radio station's music library. For example, radio stations are often interested in determining whether their listeners have become tired of a particular song due to overplay or merely due to a lack of popularity. One known method by which radio stations survey listeners is to conduct an "auditorium" test of a focus group of listeners. An "auditorium" test usually comprises gathering about one hundred music listeners in a public auditorium at the request of a radio station or research company. A brief representative portion of each song or "hook" is then played over loud speakers to the participants as a group who are then asked to record their opinion of the song represented by each "hook."

One problem associated with "auditorium" testing is convincing a sufficient number of listeners from a focus group to travel to the auditorium venue to participate in the "auditorium" survey. As an enticement to the listeners, the radio station must provide a costly reward in the form of cash or merchandise. Further, the sponsoring radio station must incur the cost of renting the auditorium and the equipment necessary to conduct the "auditorium" survey.

More importantly, however, it is believed that the "auditorium" survey is not highly accurate since the focus group of listeners are asked to listen to the song "hooks" in unfamiliar surroundings and under different conditions than those under which the focus group usually listens to the music represented by each hook.

Therefore, it would be desirable to provide a music survey method and apparatus which is inexpensive to conduct wherein a focus group listens to song "hooks" under the same conditions as those under which the focus group normally listens to the songs on the station.

SUMMARY OF THE INVENTION

It is an object of the present invention to provide an inexpensive method of surveying and reporting listener opinion of a list of songs.

It is another object to provide an accurate method of determining listener opinion of a list of songs.

These and other objects are accomplished by the present invention, which comprises a low-cost method and apparatus for surveying and reporting music listener opinion of a list of songs such as the songs comprising a radio station music library. Using the method and apparatus of the present invention, a focus group of music listeners listen to song "hooks" in the comfort of their own home or under the same conditions they normally listen to music on the radio.

The method of the present invention comprises an initial step of selecting a group of music listeners from which individual listener opinions are recorded. The select group usually comprises individual listeners selected from the geographic market served by the radio station. After an individual is selected, a home music preference test kit is fielded to the select listener for use in the listener's home. Using the home music preference test kit, a series of song hooks are identified and played to the listener in the comfort of the listener's home. The listener then records his opinion of each song and returns the completed test kit to the radio station or research group conducting the survey. In exchange for the listener's participation in the survey, the listener is rewarded a low-cost honorarium of approximately $5.00.

The home music preference test kit of the present invention comprises instructions for completing and returning the test kit. The kit also includes a music medium, such as a cassette or compact disc, having a preselected number of song hooks representing a preselected number of songs such as the songs comprising the music library of a radio station. The music medium is preferably between 90 and 120 minutes in duration and may contain between 500 and 1000 song hooks. A survey form for recording the listener's opinion of each song and an honorarium for completion of the survey are also included in the survey kit.

DETAILED DESCRIPTION OF A PREFERRED EMBODIMENT

The method and apparatus for surveying and reporting listener opinion of a list of songs are described with reference to FIGS. 1–4 which are provided for illustrative purposes only and are not meant to limit the scope of the present invention. FIG. 5 represents a flow chart of the inventive method which is described below.

A preferred purpose of the method and apparatus of the present invention is described below with reference to determining the listener appeal, familiarity, and fatigue for a list of songs comprising the music library of a radio station. However, the method and apparatus of the present invention may be used generally to determine listener appeal, familiarity, and fatigue for a list of songs for any purpose. The resultant information is used to improve the marketability of the music and/or the radio station conducting the research. The survey method may be conducted locally in a single market, regionally, or on a national scale depending on the needs of the radio station or network of stations (hereinafter collectively referred to as "the radio station").

Initially, a group of music listeners is selected from which individual listener opinions are recorded. Individual listeners may be selected based on their compliance with specific listener criteria including geographic residence, music preference, demographic age group, household income and/or racial or ethnic background.

The geographic area or geographic market from which the individual listeners are selected is usually determined by the actual geographic market for service where potential listeners or consumers reside. The geographic area for a radio station includes households within the coverage area of the station's broadcast signal. A network of radio stations may include multiple markets or the entire country where a simulcast signal is broadcast. Once a geographic area or market is selected, randomly-selected individuals are contacted and interviewed to determine their compliance with specific listener criteria defined by the radio station relevant to its music format.

Prospective survey participants are initially interviewed to determine their individual taste for specific music genres. The field of selected listeners should have an interest in the style of music being surveyed, i.e., rock listeners for rock music, classical listeners for classical music, etc. Prospective survey participants are also interviewed to determine whether they are the same age as typical listeners of the style of music to be surveyed. For example, a rock and roll station may choose to focus on listeners between the ages of 18 and 35, whereas a classical music station may choose to focus on listeners between the ages of 35 and 60.

Prospective survey participants may also be interviewed to determine their compliance with other specific listener criteria including household income, or racial or ethnic background. Prospective survey participants may also be interviewed to determine their compliance with specific radio listening criteria such as time spent per day or week listening to a particular radio station or types of radio stations.

Prospective survey participants within the selected geographic market are contacted in various ways to determine their compliance with specific listener criteria. The preferred method of recruiting is by random telephone dialing in the geographic market; however, other means may be employed such as newspaper advertisement or by contacting a known group of listeners who meet the survey's qualifying criteria.

If random telephone dialing is used, random digit dialing (RDD) is preferred. RDD utilizes known telephone prefixes or exchanges and randomly assigns the remaining digits to complete the phone number. This method assures that the most random telephone sampling procedure is obtained. Another method of telephone recruiting comprises contacting individuals from a "list sample" which can be purchased from data vendors such as the Donnelley Corporation®. Such lists of household phone numbers can be specified to include only those residents in a particular market or markets and residents in certain counties with specific telephone area codes and exchanges. With the use of census data, these lists can be further tailored to increase the likelihood of reaching prospective survey participants who comply with the defined listener criteria. Telephone calls to prospective survey participants can be made by contracting a telemarketing company to field the survey or can be made by the individual radio station itself.

No matter who contacts the prospective survey participants, the interviewer asks the prospective survey participant a series of questions to determine if the respondent meets the specific listener criteria. For example, a list of such questions may be as follows:

1) Are you between the ages of 20 and 45?
   Yes or No
2) How frequently would you listen to a radio station that played music from the following artists: The Beatles, The Rolling Stones, The Eagles?
   Very frequently, Sometimes, or Not at all
3) How much time do you spend each day listening to the radio?
   Less than 30 minutes, 30 minutes to 2 hours, more than 2 hours
4) What is your household income?
   Less than $10,000, $10,000 to $30,000, $30,000 to $60,000, more than $60,000
5) How many records, tapes, or CD's have you purchased in the last 6 months?
   Less than 3, 3 to 6, more than 6
6) In a typical week, which radio stations do you regularly listen to?
   WAAA, WBBB, WCCC
7) Which of these radio stations is your favorite to listen to?
   WAAA, WBBB, WCCC Prospective survey participants may also be asked general perceptual questions to gather general impressions about issues that may impact on the radio station's marketing strategy. For example, the prospective survey participant may be asked:

1) Which station would you say plays the most music and fewest commercials?
2) Which station would you say has the best music variety?
3) Lately, to which station have you been listening most frequently?

If the prospective survey participant complies with the specific listener criteria, the individual is recruited to participate in a home music preference test. If the prospective survey participant agrees to participate in the home music preference test, he becomes a select listener. The name and address of each select listener is recorded. Each select listener is sent a home music preference test kit to complete in the comfort of the listener's own home.

The recruiting procedure is continued until a predetermined number of select listeners are chosen. It is believed that only about 40 percent of the home music preference test kits are completed, returned and usable. Therefore, if the number of desired responses is 100, then at least about 250 select listeners should be recruited.

During the recruiting of select listeners, control questions may be asked to verify the data which is ultimately received from the listener. Control questions are usually personalized information that only the selected listener is able to answer without hesitation. For example, the listener may be asked:

1) What is your mother's maiden name?
2) What are the last four digits of your social security number?
3) What is your astrological sign?

Control questions can be asked again during subsequent contacts with the select listener or during the survey as "verification check points". The purpose of verification check points is to ensure that the person initially screened is the person who ultimately completes the survey. As described below, another form of verification can be a specific instruction on the music medium directing the respondent to perform a simple task on the survey form. For example, the select listener may be instructed to "circle the number 5 next to song number 342." This verification check point ensures that the respondent was actually listening to the tape and following instructions when completing the survey. If the expected response is not received at any of the verification check points, the entire survey is deemed unusable.

A home music preference test kit is fielded to the select listeners by mailing or otherwise delivering the home music preference test kit to the listener's home. The home music preference test kit comprises instructions for completing the test survey, a music medium containing a predetermined number of song hooks, a survey form, and an honorarium.

Figure 1:
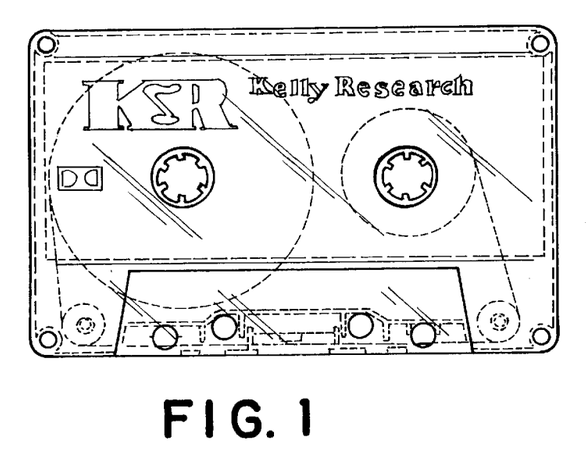
FIG. 1 is a top plan view of a music medium of the invention.

The song hooks are recorded on any type of suitable music medium such as an audio cassette, as illustrated in FIG. 1, or a compact disc. Alternatively, the kit may include instructions for receiving the song hooks via computer using digital audio, for example, either by direct datalink or via the Internet.

The music medium contains specific instructions from a narrator on how to complete the survey, and the survey instructions are also in printed form and included in the kit.

The music medium contains a predetermined number of representative portions of songs or song hooks which are to be reviewed by the select listeners. Each song hook is identified by code, for example, by introducing each song hook by number only. The length of each song hook varies depending or the type of music being surveyed. For example, contemporary, country, rock and pop songs generally require a hook of about 7 to 10 seconds to allow the listener enough time to recognize the song. Other types of music such as classical require a hook of about 60 seconds to allow the listener enough time to recognize the song. Further, if brand new or unfamiliar music is being tested, the hook may comprise the entirety of the song.

The number of song hooks included in the home music preference test kit depends on the length of the song hooks. The optimal length for the entire audio portion of the test kit is 90 to 120 minutes. For contemporary, country, rock and pop songs, it is recommended that the music medium contain 500 to 1000 song hooks, preferably about 600 song hooks. At his convenience, the select listener plays the music medium and listens to the narrated instructions and song hooks contained thereon. The select listener then records his opinion of each song on the survey form included in the kit. An example of a survey form of the present invention is illustrated in FIGS. 3A, 3B, 3C, 4A and 4B.

Figure 3A:
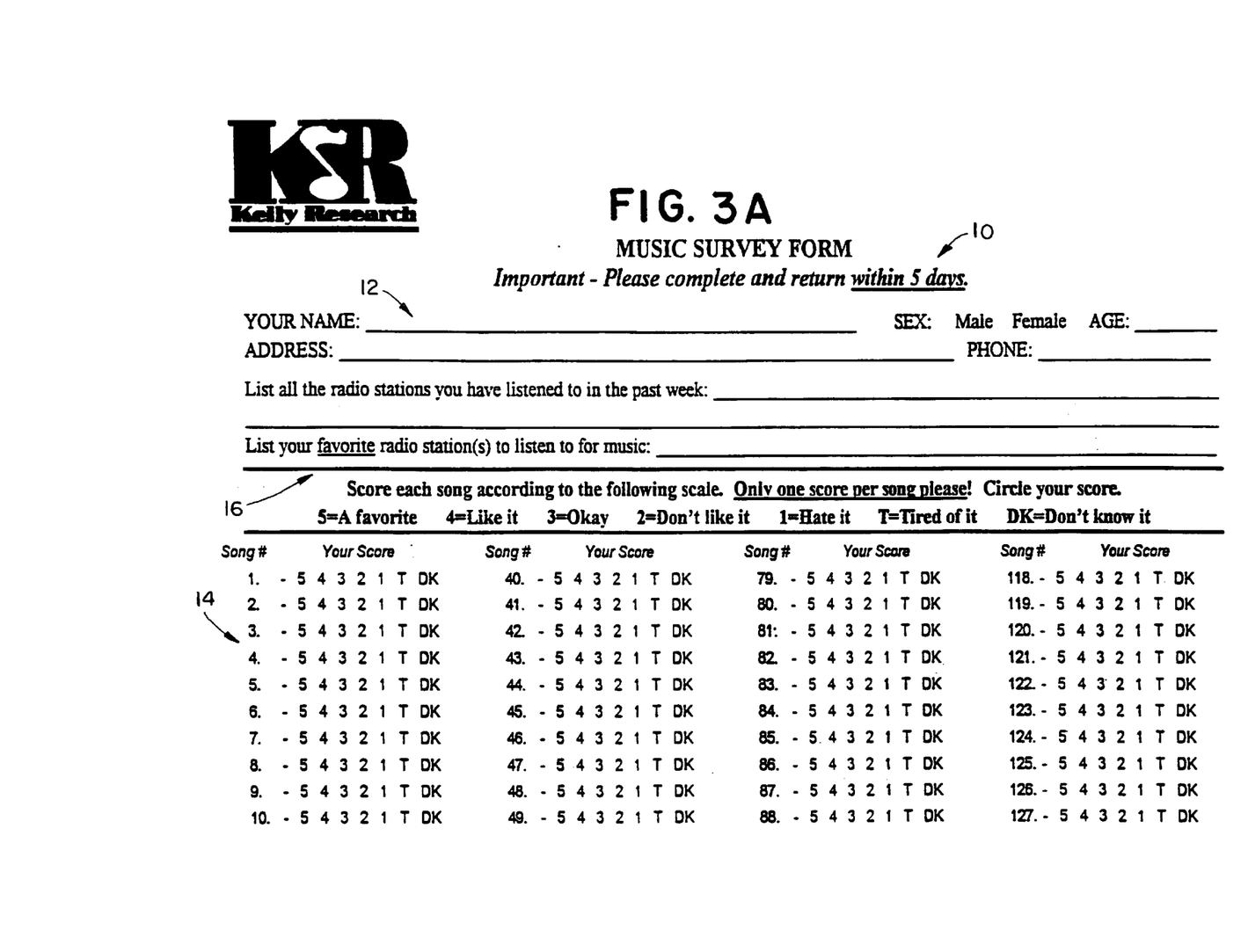
FIGS. 3A, 3B, 3C show a top plan view of a music survey form of the invention.
Figure 3B:
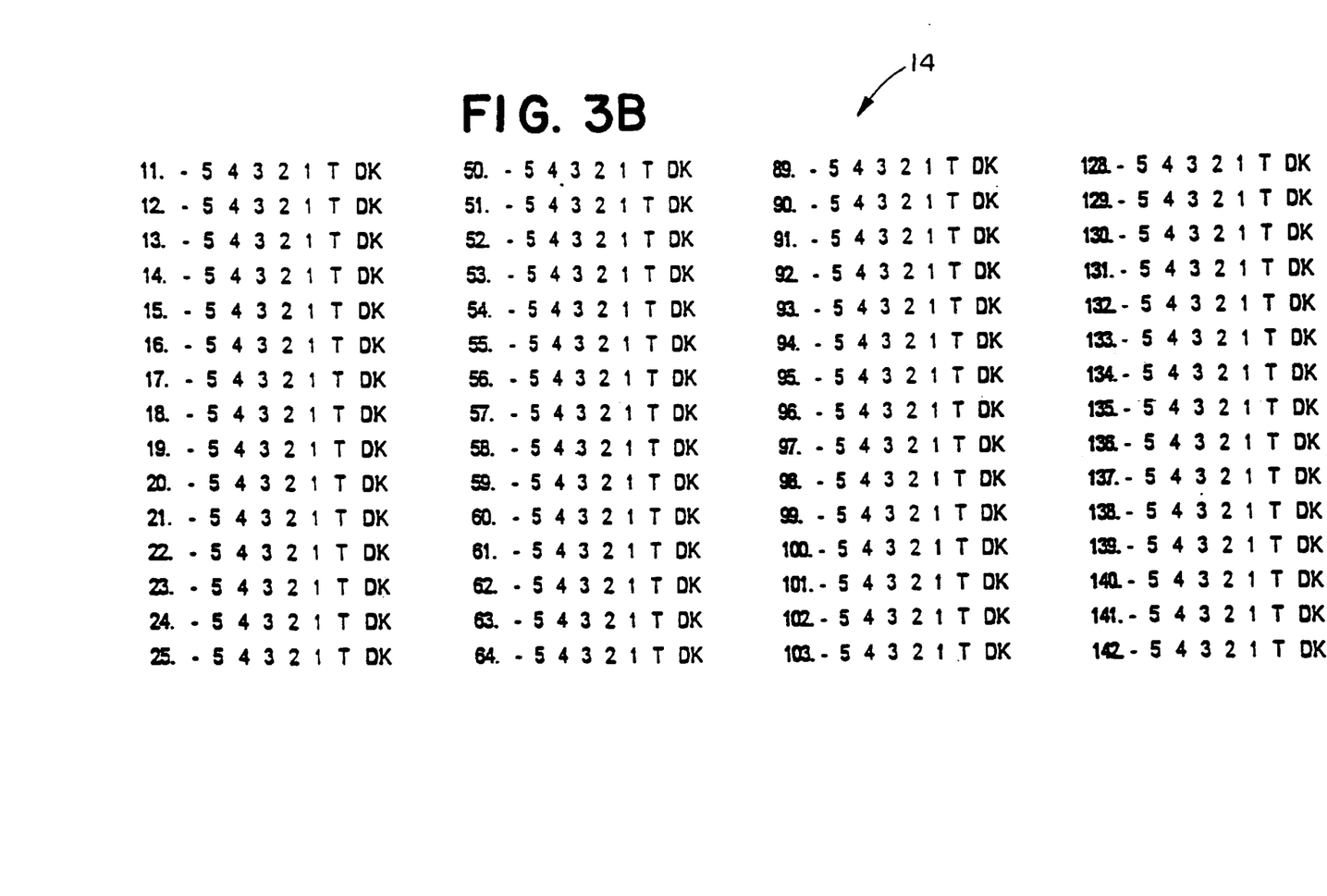
Figure 3C:
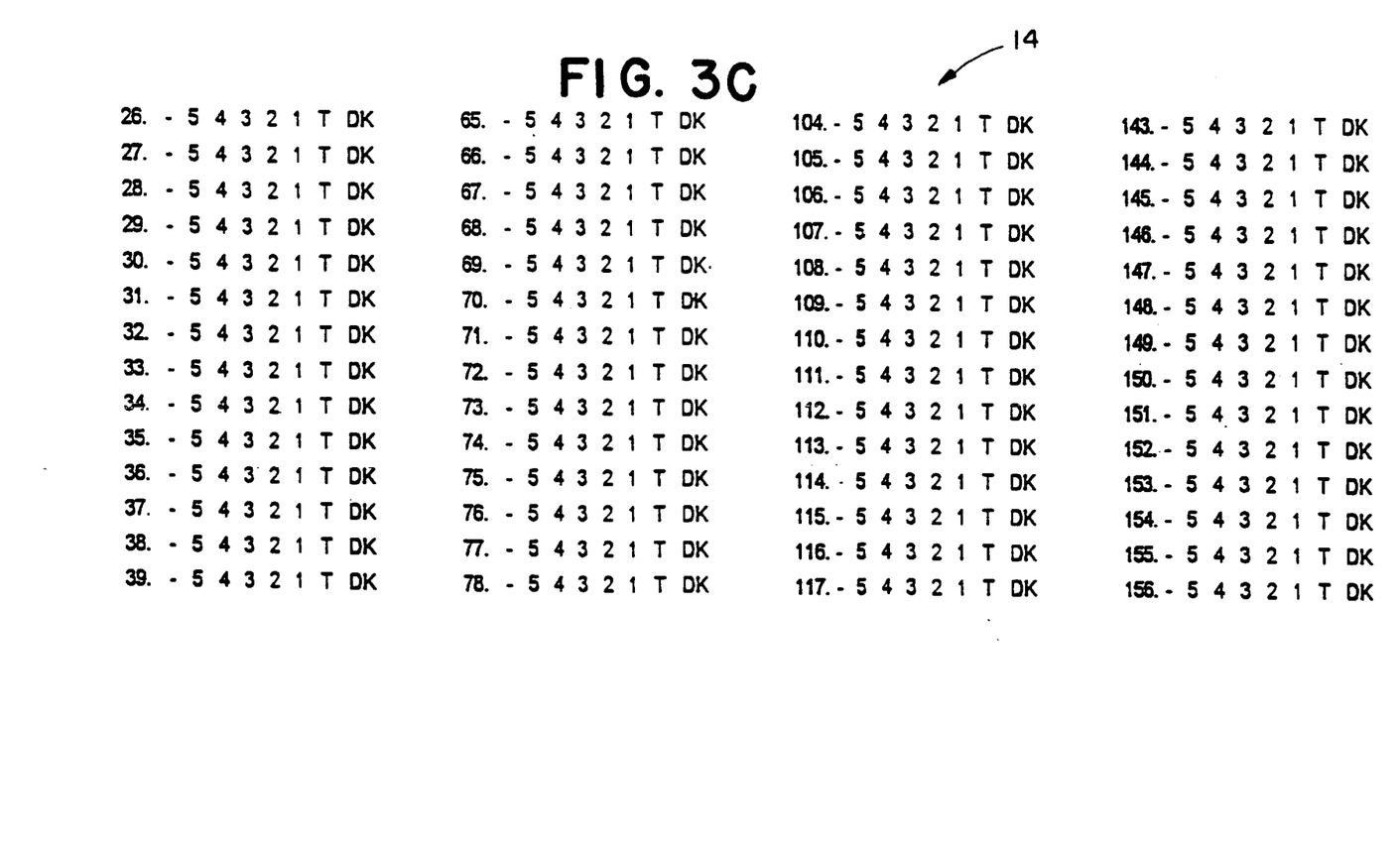

Referring to FIGS. 3A, 3B, and 3C the survey form includes a identification section 10 wherein the select listener identifies himself by, for example, name, address, sex, age, and telephone number. The form also includes a survey section 12 wherein survey questions are asked of the select listener.

The survey form also includes a scoring section 14 wherein the select listener records his opinion about each song represented by each song hook according to "Likert" scale definitions wherein the following scores represent the following opinions about each song:

5 - a favorite
4 - like it
3 - ok
2 - don't like it
1 - hate it

The select listener may also record one of the following opinions which may be more appropriate for a song:

DK - don't know it
T - tired of hearing it

These definitions are set forth in an instruction section 16 immediately preceding the scoring section of the survey form.

Figure 4A:
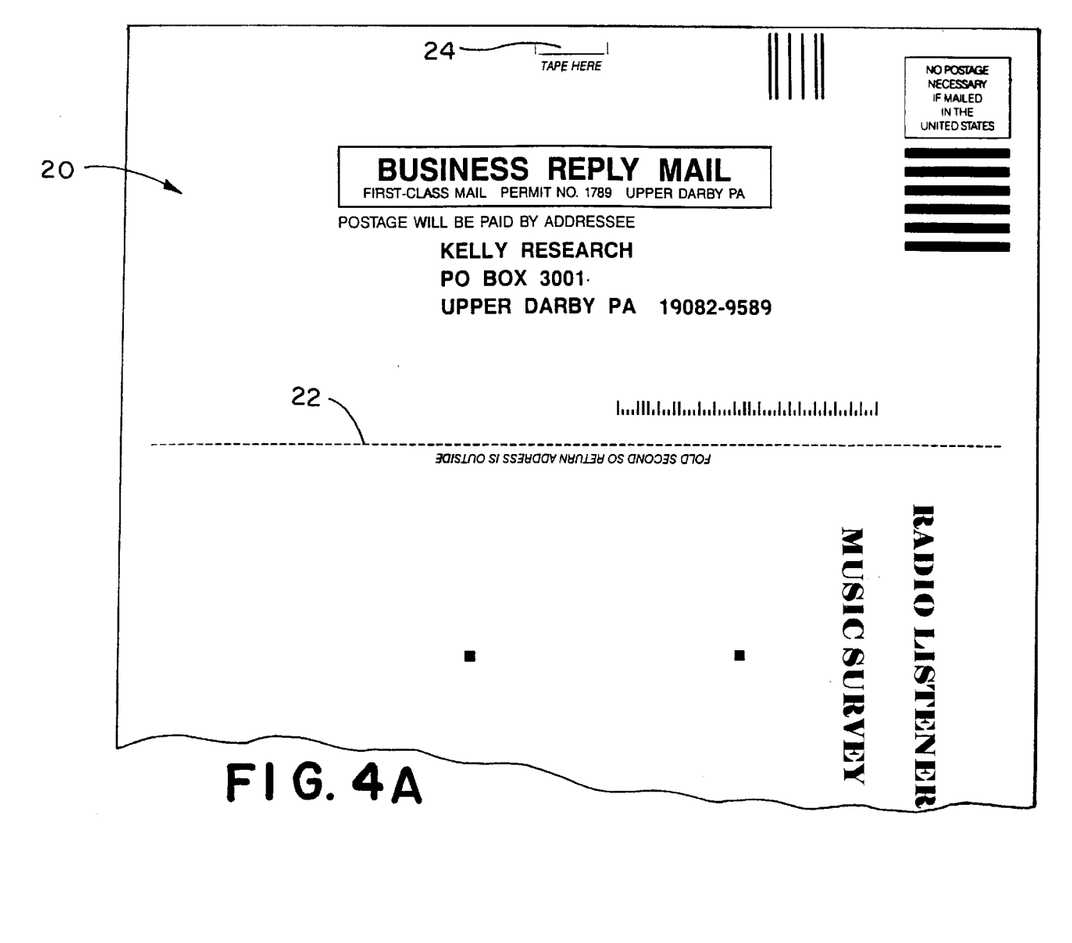
FIGS. 4A and 4B show a top plan view of the reverse side of the music survey form of FIG. 3.
Figure 4B:
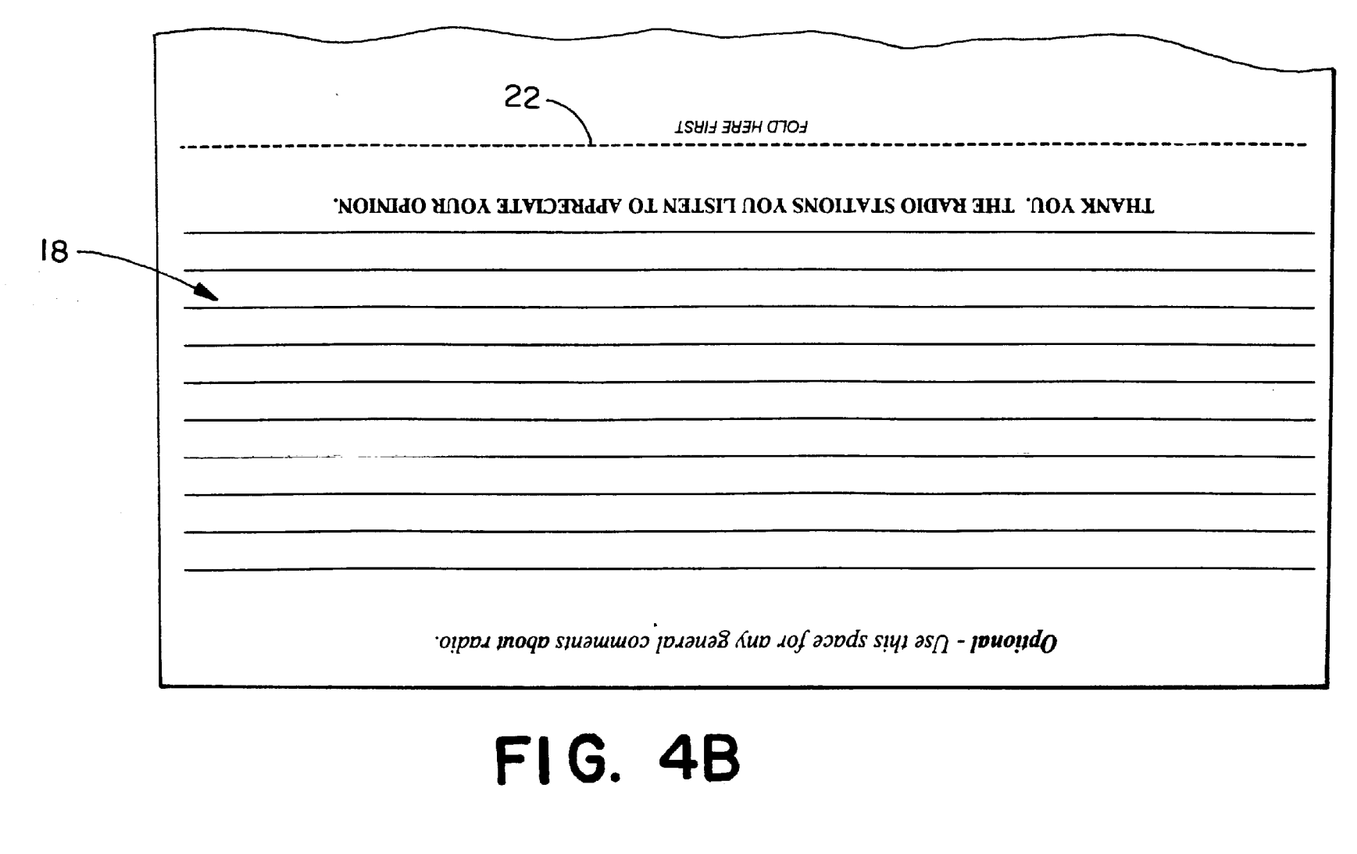
Figure 5:
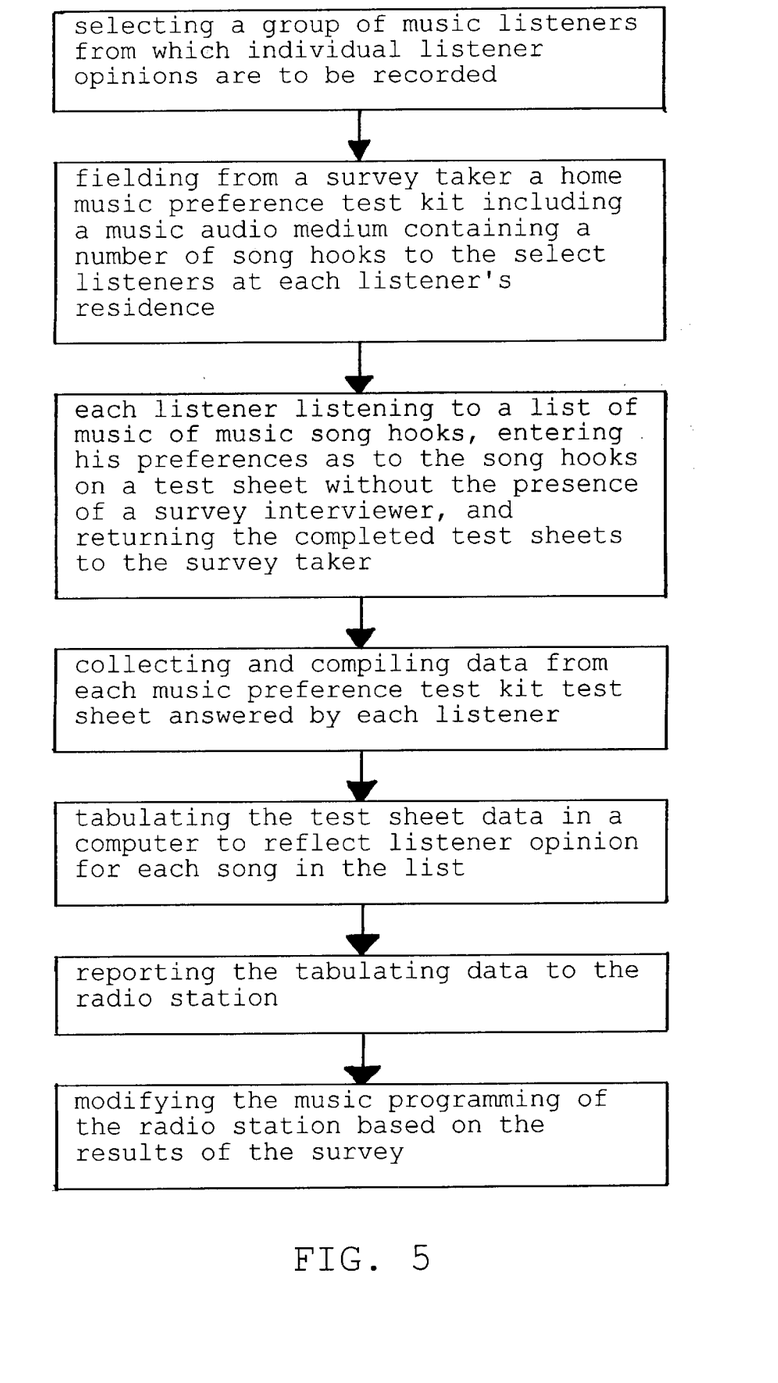
FIG. 5 shows flow chart of the inventive method.

Referring to FIGS. 4A and 4B, the survey form also includes a comment section 18 wherein additional written perceptual questions or general comments may be recorded by the select listener. The survey form also includes a return address section 20 having the radio station or the research company's address preprinted on the form and including prepaid postage. Once the survey form is completed by the select listener, the form may be folded along section lines 22, taped closed near the center 24 and then deposited in a postage box. The survey form is designed to maximize the ease with which the select listener may complete and return the form to the radio station or research company.

Figure 2:
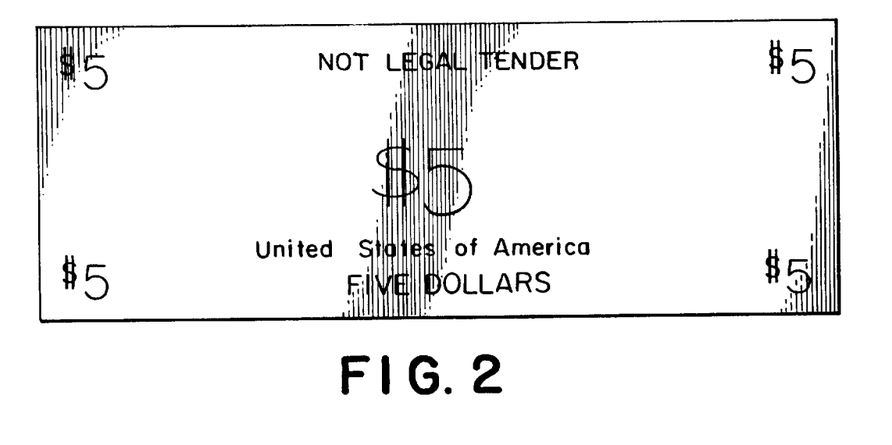
FIG. 2 is a top plan view of an honorarium of the invention.

The home music preference test kit also includes an honorarium in the form of money or other valuable merchandize. In order to keep the cost of the test kit low, an honorarium in an amount of $5 to $30 U.S. dollars, preferably $5 U.S. dollars should be provided. An example of an honorarium of the present invention is shown in FIG. 2.

After the home music preference test kit has been fielded to the select listener, a follow-up phone call is made to the select listener to confirm the arrival of the kit and to remind the select listener that the completed form should be returned within five days. Five days after the select listener receives the home music preference test kit, another follow-up phone call is made to confirm that the survey was completed and returned as specified either by mail, fax, E-mail or other appropriate means. At this time, verification questions may be asked to ensure that the test procedure was followed properly.

Upon receipt of completed survey forms, the select listener responses are entered into a computerized data management program for the purpose of compiling completed reports. Information entered include the select listener's sex, age, music preferences, radio station partisanship, and any other information requested such as, time spent listening to the radio, household income, etc. The select listener's opinions about each of the songs in the survey are also entered at this time.

To achieve reliable results, it is best to include a minimum of 75 completed surveys. However, a more desirable number of surveys is about 100 completed surveys.

The data is tabulated to reflect a mean or average score for each song in the survey on a 1–5 scale. The percentage of the respondents who are unfamiliar with the song and the percentage of respondents who are tired of hearing the song on the radio are also shown. The data is further cross-tabulated to reflect the findings among specific sub-groups of the total group. For example, such sub-groups may include males only, females only, specific demographic age groups, or groups having particular music preferences or radio station listening habits. For each of these sub-groups, responses are shown in the same style as those shown for the total group. Information is generally sorted in descending order by appeal score for ease of use and implementation of the findings.

Radio stations usually have different exposure levels or rotations for the many songs in their libraries. Using the results of the method and apparatus of the present invention, radio stations can identify the songs in their library which listeners like, dislike, don't know or are tired of. Radio stations may then modify their programming based on the results of the survey. For example, songs achieving the best scores may receive greater air play, while songs receiving the lowest scores will receive less or possibly no air play at all.

For the purposes of cross reference, an additional report is generally produced showing all test songs listed in alphabetical order by artist name and its corresponding scores. A radio station can project that the interest of its total audience will resemble the interest of the group and therefore with proper implementation of the research findings, achieve higher listernership as a result of the survey method and home music preference test kit of the present invention.

I claim:

1. A method of surveying and reporting listener opinion of a list of songs from the music library of a radio station including the steps of:
   a) selecting a group of music listeners from which individual listener opinions are to be recorded;
   b) fielding from a survey taker a home music preference test kit including a music audio medium containing a number of song hooks to the select listeners at each listener's residence;
      each listener listening to a list of music of music song hooks,
      entering his preferences as to the song hooks on a test sheet without the presence of a survey interviewer;
      returning the completed test sheets to the survey taker,
   c) collecting and compiling data from each music preference test kit test sheet answered by each listener;
   d) tabulating the test sheet data in a computer to reflect listener opinion for each song in the list,
      reporting the tabulated data to the radio station, and modifying the music programming of the radio station based on the results of the survey.

2. The method of claim 1 wherein the step of selecting a group comprises defining a geographic market from which the music listeners are selected.

3. The method of claim 2 wherein the step of selecting a group comprises contacting and interviewing randomly-selected individuals within the geographic market to determine their compliance with specific listener criteria.

4. The method of claim 3 wherein the step of contacting randomly-selected individuals comprises random telephone dialing in the geographic market using random digit dialing utilizing known telephone prefixes or exchanges.

5. The method of claim 3 wherein the step of contacting randomly-selected individuals comprises publicly advertising in the geographic market.

6. The method of claim 3 wherein the step of interviewing randomly-selected individuals comprises asking individuals a series of questions to determine if the individual meets the specific listener criteria.

7. The method of claim 6 including the step of asking perceptual questions to gather general impressions about issues that may impact a radio station's marketing strategy.

8. The method of claim 3 wherein the step of selecting a group further includes recruiting the individuals complying with the specific listener criteria.

9. The method of claim 8 including the step of recruiting individuals from a demographic age group, a household income range, or a particular racial or ethnic background.

10. The method of claim 8 wherein the step of recruiting individuals comprises inviting the individual to participate in a home music survey.

11. The method of claim 10 including the step of asking the individuals control questions to verify data received from the individual.

12. The method of claim 2 wherein the step of selecting a group comprises telephone contacting individuals on a list sample who meet the specific listener criteria.

13. The method of claim 1 wherein the step of fielding a home music preference test kit comprises delivering the test kit to the select listeners, said test kit including instructions for completing the test survey, a music medium containing a number of song hooks, a survey form, and an honorarium.

14. The method of claim 13 including the step of providing a control device to verify the data received from the select individual.

15. The method of claim 14 including the step of including verification checkpoints in the survey.

16. The method of claim 13 including the step of placing a follow-up telephone call to the select listener to confirm arrival of the home music preference test kit at the select listener's residence.

17. The method of claim 16 including the step of instructing the select listener that the completed test should be returned within a predetermined short duration.

18. The method of claim 17 including the step placing a second follow-up telephone call to the select listener to confirm that the home music preference test was completed and returned.

19. The method of claim 18 including the step of asking verification questions to ensure that the correct procedure was followed for completing the test.

20. The method of claim 1 including tabulating the data to reflect a mean or average listener opinion of each song in the list.

21. The method of claim 1 including the step of cross-tabulating the data to reflect the opinions of specific subgroups of select listeners.

22. A method of surveying and reporting listener opinion of a list of songs from the music library of a radio station including the steps of:
   a) a survey taker contacting the listener at his residence; supplying the listener with an audio music medium at his residence;
   b) identifying by code an abbreviated portion of a song in the list and recorded on the audio music medium;
   c) playing the audio music medium in his residence to play the abbreviated portion of the song to the listener at his residence;
   d) recording the listener s opinion of the song on a test sheet; and,
   e) repeating steps b–d until each of the songs in the library list is surveyed; returning the test sheets to the survey taker;
   f) tabulating the test sheet data to reflect listener opinion for each song in the list;
   g) reporting the tabulated data to the radio station;
   k) and modifying the music programming of the radio station based on the results of the survey.

23. The method of claim 22 including the step of selecting the listener from a group of randomly-contacted individuals based on the listener's compliance with specific listener criteria.

24. The method of claim 23 including the step of repeating steps a–e on different listeners until a predetermined number of opinions are obtained.

25. The method of claim 24 including the step of tabulating the opinions to reflect a mean or average listener opinion for each song in the list.

26. The method of claim 25 including the step of offering and awarding the listener an honorarium for agreeing to participate in the survey.

27. The method of claim 26 wherein the survey is conducted on a minimum of 75 listeners.

28. A method of increasing the market share of a radio station comprising the steps of:
   a) surveying and reporting listener opinion of the radio station's library of songs including the steps of:
      i) contacting a predetermined number of listeners residing within the radio station's geographic market;
      ii) identifying by code an abbreviated portion of each song in the library;
      iii) playing the abbreviated portion of each song to each listeners at the listener's residence; and iv) recording each listener's opinion of each song;

b) tabulating the data to reflect a mean or average listener opinion for each song in the library; and c) modifying the radio station's music programming based on the results of the survey.

29. Apparatus for surveying and reporting listener opinion of a list of songs from the music library of a radio station and modifying the radio programming of the radio station comprises a home music preference test kit for surveying and reporting listener opinion of a list of songs comprising:

a) instructions for completing and returning the test kit;

b) an audio music medium having a pre-recorded song hook representing each song in the list;

c) survey form for recording the listener's opinion of each song represented by each song hook;

d) an honorarium for completion of the survey;

e) computer means for tabulating the results of the compiled survey forms;

f) and means for modifying the radio station's music programming based on the results of the survey.

30. The test kit of claim 29 wherein each hook comprises an short representative portion of a song in the list.

31. The test kit of claim 30 wherein each hook is about 7–10 seconds in duration for contemporary, country, rock and pop songs, and about 1 minute in duration for classical music.

32. The test kit of claim 31, said music medium comprising an audio cassette, compact audio disc or CD-ROM computer disc.

33. The test kit of claim 29, each song hook including an audio identification code corresponding to an opinion recording location of the survey form.

34. The test kit of claim 33, said survey form comprising an opinion grid corresponding to the audio identification code of each song hook for recording the listener's opinion of each song, each grid having Likert scale definitions from 1 to 5 wherein the values 1 to 5 correspond to the following listener opinions, respectively: hate it; don't like it; okay; like it; and, a favorite.

35. The test kit of claim 34, said survey form further comprising opinion grids corresponding to the audio identification code of each song hook for reporting if the listener does not know the a particular song or if the listener is tired of hearing a particular song.

36. The test kit of claim 35, said survey form having a preprinted return address and prepaid postage on one side of the form.

37. The test kit of claim 29, said music medium containing 500 to 1000 hooks and having a total play time of about 90 to 120 minutes.

38. The test kit of claim 29, said music medium containing about 600 songs.

39. The test kit of claim 29, said honorarium comprising 5 to 30 U.S. dollars.

40. The test kit of claim 29, said honorarium comprising about 5 U.S. dollars.

* * * * *